(12) United States Patent
Huang et al.

(10) Patent No.: US 7,961,706 B2
(45) Date of Patent: Jun. 14, 2011

(54) CONTROL METHOD, SYSTEM AND FUNCTION ENTITY FOR REPORTING BEARER EVENT OF SIGNALING IP FLOW

(75) Inventors: Shibi Huang, Shenzhen (CN); Peng Zhao, Shenzhen (CN); Yuxin Mao, Shenzhen (CN); Shiyong Tan, Shenzhen (CN); Weihua Wei, Shenzhen (CN); Yan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/634,147

(22) Filed: Dec. 9, 2009

(65) Prior Publication Data

US 2010/0074110 A1 Mar. 25, 2010

Related U.S. Application Data

(63) Continuation of application No. 12/052,487, filed on Mar. 20, 2008.

(30) Foreign Application Priority Data

Mar. 23, 2007 (CN) .............................. 200710087199
Apr. 17, 2007 (CN) .............................. 200710100495

(51) Int. Cl.
  *H04J 3/24* (2006.01)
(52) U.S. Cl. ...................................... 370/349; 370/310
(58) Field of Classification Search ........................ None
  See application file for complete search history.

(56) References Cited

U.S. PATENT DOCUMENTS

| 6,594,246 B1 | 7/2003 | Jorgensen |
| 7,330,542 B2 | 2/2008 | Kauhanen et al. |

(Continued)

FOREIGN PATENT DOCUMENTS

CN 1809218 A 7/2006

(Continued)

OTHER PUBLICATIONS

3rd Generation Partnership Project; Technical Specification Group Services and System Aspects;Overall High Level Functionality and Architecture Impacts of Flow Based Charging, Technical Report 23.125 v 6.8.0:1-49(Mar. 2006).

(Continued)

*Primary Examiner* — Charles N. Appiah
*Assistant Examiner* — Willie J Daniel, Jr.

(57) ABSTRACT

A control method, system and function entity for reporting a bearer event of a signaling IP flow are provided. Flow identifier information such as a 5-tuple is generated for a signaling IP flow and a media IP flow so as to unify a mechanism for reporting a signaling path status and a mechanism for reporting a bearer event of a media IP flow, so that the mechanism for reporting a signaling path status is not limited by the parameter of Flow Usage, the PDP context with a signaling tag, thereby establishing corresponding PCC rules for signaling and the association between a signaling IP flow and a bearer. A method for reporting a signaling path status is further provided in the invention. In the method, for a default PDP context or a PDP context of a signaling IP flow, the predefined PCC rules are activated or signaling PCC rules generated in accordance with an Application Function address are installed, thereby an IP signaling path status is reported in accordance with rule names of the predefine PCC rules or the signaling PCC rules.

5 Claims, 11 Drawing Sheets

U.S. PATENT DOCUMENTS

| | | | |
|---|---|---|---|
| 7,522,613 | B2 | 4/2009 | Rotsten et al. |
| 7,546,376 | B2 * | 6/2009 | Widegren et al. ............. 709/232 |
| 2002/0184510 | A1 | 12/2002 | Shieh |
| 2004/0049596 | A1 | 3/2004 | Schuehler et al. |
| 2005/0026558 | A1 | 2/2005 | Stura et al. |
| 2005/0118946 | A1 | 6/2005 | Colban et al. |
| 2005/0122945 | A1 | 6/2005 | Hurtta |
| 2006/0056307 | A1 | 3/2006 | Hellgren et al. |
| 2007/0147244 | A1 | 6/2007 | Rasanen |
| 2007/0223450 | A1 * | 9/2007 | Holmstrom et al. .......... 370/352 |
| 2007/0274522 | A1 | 11/2007 | Boman et al. |
| 2008/0052258 | A1 | 2/2008 | Wang et al. |
| 2008/0253368 | A1 * | 10/2008 | Rasanen ...................... 370/389 |
| 2008/0307081 | A1 | 12/2008 | Dobbins et al. |
| 2009/0010271 | A1 | 1/2009 | Bachmann et al. |
| 2009/0204723 | A1 * | 8/2009 | Tonsing et al. ............... 709/238 |
| 2009/0215454 | A1 * | 8/2009 | Przybysz et al. ........... 455/435.1 |
| 2010/0040047 | A1 | 2/2010 | Castellanos Zamora et al. |

FOREIGN PATENT DOCUMENTS

| | | |
|---|---|---|
| CN | 1889499 A | 1/2007 |
| CN | 101110766 A | 1/2008 |
| EP | 1419614 A2 | 5/2004 |
| WO | 2005109938 A1 | 11/2005 |
| WO | 2007149020 A1 | 12/2007 |

OTHER PUBLICATIONS

3rd Generation Partnership Project; Technical Specification Group Services and System Aspects;Evolution of Policy Control and Charging, Technical Report 23.803 v 7.0.0: 1-30 (Sep. 2005).

"3GPP TS 23.203 v 7.1.0 3rd Generation Partnership Project; Technical Specification Group Service and System Aspects; Policy and Charging Control Architecture (Release 7),"1-70 (Dec. 1, 2006) http://www.3gpp.org.ftp/Specs/archive/23%5Fseries/23.203/.>.

"3GPP TS 29.214 v 1.1.0 3rd Generation Partnership Project; Technical Specification Group Core Network and Terminals; Policy and Charging Control Over Rx Reference Point (Release 7),"1-29 (Feb. 1, 2007) http://www.3gpp.org.ftp/Specs/archive/29%5Fseries/29.214/>.

"3GPP TS 29.212 v 1.1.0 3rd Generation Partnership Project; Technical Specification Group Core Network and Terminals; Policy and Charging Control Over Gx Reference Point (Release 7)," 1-33 (Feb. 1, 2007) http://www.3gpp.org.ftp/Specs/archive/29%5Fseries/29.212/>.

"Telecommunications and Internet Converged Services and Protocols for Advanced Networking (TISPAN); Resource and Admission Control: Diameter Protocol for Session Based Policy Set-Up Information Exchange Between the Application Function (AF) and the Service Policy Decision Function (SPDF); Protocol specification," ETSI Standards, TISPAN(V1.1.2), 1-35 (Mar. 1, 2006).

3GPP TS 29.212 V1.1.0 (Feb. 2007) 3rd Generation Partnership Project;Technical Specification Group Core Network and Terminals; Policy and Charging Control over Gx reference point(Release 7).

3GPP TS 23.125 V6.8.0 (Mar. 2006)3rd Generation Partnership Project;Technical Specification Group Services and System Aspects;Overall high level functionality and architecture impacts of flow based charging;Stage 2(Release 6).

3GPP TS 29.214 V1.1.0 (Feb. 2007) 3rd Generation Partnership Project;Technical Specification Group Core Network and Terminals;Policy and Charging Control over Rx reference point(Release 7).

3GPP TR 23.803 V7.0.0 (Sep. 2005) 3rd Generation Partnership Project;Technical Specification Group Services and System Aspects;Evolution of policy control and charging(Release 7).

3GPP TS 23.203 V7.1.0 (Dec. 2006) 3rd Generation Partnership Project;Technical Specification Group Services and System Aspects;Policy and charging control architecture(Release 7).

* cited by examiner

US 7,961,706 B2

CONTROL METHOD, SYSTEM AND FUNCTION ENTITY FOR REPORTING BEARER EVENT OF SIGNALING IP FLOW

CROSS-REFERENCE TO RELATED APPLICATIONS

This application is a continuation of U.S. patent application Ser. No. 12/052,487 entitled "Control Method, System and Function Entity for Reporting Bearer Event of Signaling IP Flow" and filed on Mar. 20, 2008, which is a continuation of international patent application No. PCT/CN2008/070344, entitled "Control Method, System and Function Entity for Reporting Bearer Event of Signaling IP Flow" and filed on Feb. 22, 2008, which claims the benefits to Chinese patent application No. 200710087199.6, entitled "Control method and function entity for reporting bearer event of signaling IP flow" and filed on Mar. 23, 2007, Chinese patent application No. 200710100495.5, entitled "Control method and function entity for reporting bearer event of signaling IP flow" and filed on Apr. 17, 2007, the entire contents of which are incorporated herein by reference in their entireties.

FIELD OF THE INVENTION

The present invention relates to communication technologies and in particular to a control method, system and a function entity for reporting a bearer event of a signaling Internet Protocol (IP) flow.

BACKGROUND OF THE INVENTION

An IP Multimedia Subsystem (IMS) policy control mechanism (i.e. a Service Based Local Policy (SBLP)) and a Flow Based Charging (FBC) technology are specified in Third Generation Partnership Project (3GPP) R6 protocol standards. However, the policy control involves numerous functions similar to those of the Flow Based Charging with respect to particular procedures, and the separation of the policy control and the Flow Based Charging necessarily results in the increased complexity of network configuration and the increased cost, furthermore, the control efficiency is reduced, thus influencing user experience. The standard of the 3GPP Release 7 converges the policy control and the Flow Based Charging and proposes a Policy Control and Charging (PCC) architecture, as illustrated in the broken line block of FIG. 1, the architecture includes an Online Charging System (OCS) which further includes a Customized Applications for Mobile Network Enhanced Logic Service Control Point (CAMEL SCP) and a Service Data Flow Based Credit Control.

An Application Function (AF) is an application function entity such as a Proxy Call Session Control Function (P-CSCF) in the IMS, and is adapted to provide a Policy Control and Charging Rules Function (PCRF) with dynamic session information for policy establishment and charging control. The PCRF is adapted to, in accordance with application layer service information, bearer layer information, local operator configuration and a user subscription profile, provide a Policy and Charging Enforcement Function (PCEF) with QoS authorization and charging rules and make a decision of a gating function on user plane data (for example, disabling of gating, and discarding of an IP packet). The PCEF is typically arranged in a Gateway (GW) such as a Gateway GPRS Support Node (GGSN) in the General Packet Radio Service (GPRS), and is adapted to, in accordance with the policy rules sent from the PCRF, perform QoS processing, detect a service data flow and perform such a function as online/offline charging. A Subscription Profile Repository (SPR) is a logical entity adapted to store and provide the user subscription profile required for policy establishment and charging control for the PCRF.

With the PCC architecture, an operator may perform a control on QoS, charging, etc., of a data flow at the bearer layer, thereby enabling details of a transport network to be hidden from the upper service layer, in other words, the service layer is above a bearer control layer, and the bearer control layer hides the details of the bearer layer from the service layer; and perceiving the usage of resources at the lower transport network. The PCRF, on one hand, may establish a policy in accordance with session negotiation information indicated by the service layer to control the usage of network resources at the bearer layer, and on the other hand, notify the service layer through a reporting mechanism of a change on the usage of the underlying bearer, such as a resource loss and a gateway failure, so that the service layer may make an appropriate modification and provide a corresponding policy.

The following two terms are explained for the purpose of facilitating an understanding of the invention.

Flow identifier information: The flow identifier information is expressed as a 2-tuple <a media component number (for example, a Media Component Number AVP), an IP flow number (for example, a Flow Number VAP)>. The media component number identifies a media type, such as an audio flow and a video flow. A media component may include one or more IP flows. The flow identifier information is derived from the Session Description Protocol (SDP) information obtained after session negotiation and uniquely identifies a media IP flow.

A 5-tuple (for example, a Flow Description AVP) consists of <a source address, a source port number, a destination address, a destination port number, and a protocol>. The source address and the source port number identify an IP address and a port number of an initiator of a session. The destination address and the destination port number identify an IP address and a port number of a receiver of the session. The protocol identifies a protocol used for transport of a media IP flow. The 5-tuple identifies uniquely a media IP flow and is adapted for associating the media IP flow with a specific bearer during the session (which is implemented by binding the 5-tuple with a Traffic Flow Template (TFT) identifying uniquely the bearer). The 5-tuple is derived in accordance with the SDP for session negotiation.

In the specification of the PCC architecture, the AF subscribes to the usage of a media bearer, thus allowing a media bearer event to be reported. Upon detection of a bearer event, the PCEF reports the bearer event to the PCRF and requests a new policy. The PCRF notifies the AF of the change of the bearer corresponding to an IP flow through event reporting before establishing the new policy. The AF sends to the PCRF the adjusted session information, based on which the PCRF establishes new PCC rules. A specific implementation of subscribing to a media bearer event and reporting the media bearer event is illustrated in FIG. 2.

Steps S201-S206 illustrate a procedure of subscribing to a bearer event report and are described as follows.

Step S201. The AF sends application layer service information to the PCRF, to subscribe to a bearer event report. Session parameters such as a parameter of media component number (i.e. a Media Component Number AVP), a parameter of flow number (i.e. a Flow Number AVP), a parameter of 5-tuple (i.e. a Flow Description AVP) and a parameter of specific action (i.e. A Specific Action AVP) indicating a specific bearer event (such as a bearer loss and a bearer release) to be subscribed to, are carried in an Authorize-Authenticate-Request (AAR).

Steps S202-S203. The PCRF stores the received session parameters and returns an Authorize-Authenticate-Answer (AAA) response.

Step S204. The PCRF establishes and stores PCC rules in accordance with service layer information, bearer layer information (provided to the PCRF by the PCEF upon a PDP context establishment request), a subscription profile and a local policy of an operator.

Steps S205-206. The PCRF sends PCC rules to the PCEF through a parameter of Charging Rule Install in a Re-Auth-Request (RAR) message, with the PPC rules being carried in the parameter of Charging Rule Install. Further, the RAR message includes PCC rule names generated for the PCC rules.

If not requested previously the PCEF to detect a bearer event, the PCRF carries a parameter of Event Trigger for indicating a specific bearer event to be detected, such as a bearer loss and a bearer release.

Steps S207-S211 illustrate a procedure of reporting a bearer event and are described as follows.

Step S207. A bearer event is detected by the PCEF.

Steps S208-S209. The PCEF reports the PCC rule names associated with the bearer to the PCRF, through a parameter of Charging Rule Report carrying the PCC rule names in a Credit-Control-Request (CCR) message. During the reporting, the parameter of Event Trigger indicating the bearer event is also carried. Upon receiving the message, the PCRF returns a Credit-Control-Answer (CCA) message to the PCEF.

Steps S210-S211. The PCRF reports to the AF an identifier of the influenced media IP flow along with the bearer event in accordance with the PCC rule names reported by the PCEF. The RAR message carries a parameter of Flows which indicates identifier of the media IP flow associated with the bearer event, and the parameter of Flows includes a media component number and a flow number. The RAR message further carries a parameter of specific action indicating the specific bearer event. Upon receiving the message, the AF returns an RAA message to the PCRF.

With the mechanism of reporting a bearer event, the bearer layer may notify timely the service layer of the bearer event to request a new policy, when a bearer change such as a bearer resource loss and a gateway failure occurs. The service layer perceives the bearer change with the reporting mechanism, and responds to the bearer change, for example, the service layer may request a session modification, a session termination and the like.

Similar to a media IP flow, a signaling IP flow during a session also utilizes a bearer, and the service layer needs to know timely conditions of the underlying bearer related to the signaling. When the bearer related to the signaling is changed, the bearer needs to report a bearer event to the service layer, so that the service layer may make a corresponding modification timely. An existing method for reporting a status of a signaling path is as follows.

A signaling tag is carried in a Packet Data Protocol (PDP) activation request by a User Equipment (UE). The PCRF perceives that a PDP context to be established is used to bear IP signaling, and establishes and sends PCC rules to the PCEF, thereby establishing the PDP context with the signaling tag. Upon subscribing to a signaling path status report, the AF carries a signaling IP flow tag to notify the PCRF about the subscription to a signaling event. Upon detection of a change on the bearer with the signaling tag, the PCEF reports to the PCRF the PCC rule names associated with the bearer, and the PCRF perceives a change of the PDP context bearing the signaling in accordance with the PCC rule names, so that the signaling path status is reported to the AS.

A specific implementation of reporting a signaling path status is illustrated in FIG. 3.

The steps S301-S307 illustrate a procedure of establishing a PDP context with a signaling tag and are described particularly as follows.

Step S301. The PCEF receives from a UE a PDP context activation request carrying a signaling tag.

Step S302. The PCEF sends a PDP context establishment request to the PCRF. The CCR message carries bearer layer information such as a parameter of Bearer Usage, which indicates that establishment of a PDP context with the signaling tag is requested. Optionally, the PCRF returns a CCA message to the PCEF (not shown).

Step S303. The PCRF stores the received bearer layer information, and perceives that the PDP context to be established as requested is used to bear IMS signaling in accordance with the parameter of Bearer Usage.

Step S304. The PCRF generates PCC rules and the corresponding PCC rule names in accordance with the bearer layer information, a subscription profile and an operator policy.

Steps S305-S307. The PCRF sends the PCC rules and the corresponding PCC rule names to the PCEF, and the PCEF installs the PCC rules and returns a response to the PDP context activation request to the UE, so that the PDP context with the signaling tag is established.

The steps S308-S312 illustrate a procedure of subscribing to a signaling path status report and are described particularly as follows.

S308-S310. When a session message arrives at an AF, the AF initiates a subscription to a signaling path status report. Parameters of Flow Usage (set as AF signaling, which indicates a subscription related to a signaling event) and specific action (indicating a specific subscribed event, such as a bearer loss and a bearer release) are carried in An AAR message. The PCRF perceives that this subscription is a subscription related to a signaling patch status in accordance with the value of the parameter of Flow usage.

S311-S312. The PCRF sends the PCC rules to the PCEF. A parameter of Charging Rule Install indicating the PCC rules is carried in an RAR message. If detection of the bearer event by the PCEF is not subscribed to, the PCRF initiates subscription, with a parameter of Event Trigger indicating a specific bearer event being carried. The parameter of Event Trigger is generated in accordance with the parameter of specific action.

The steps S313-S318 illustrate a procedure of reporting a signaling path status and are described particularly as follows.

Step S313. A bearer event is detected by the PCEF.

Steps S314-S315. The PCEF reports the PCC rules associated with the bearer to the PCRF.

Steps S316-S318. The PCRF determines a change of a PDP channel bearing IMS signaling in accordance with the PCC rule names and reports the signaling patch status.

The implementation of the existing mechanism for reporting a signaling path status is dependent on the parameter of Flow Usage. Upon initiating a subscription to a signaling path status, the service layer uses the parameter of Flow Usage as an AF signaling identifier to notify the PCRF of the signaling-related subscription. As defined currently, however, the parameter of Flow Usage exists as a sub-parameter of a parameter of Media Sub-Component, and the parameter of Flow Usage has to be used along with the parameters of Media Component Description and Media Sub-Component.

For a signaling IP flow, no value of the parameter of Media Component Description or the parameter of Media Sub-Component is defined in the existing standard. As a result, no signaling information is allowed to be reported, and consequently, no mechanism for reporting a signaling path status can be implemented.

SUMMARY OF THE INVENTION

Embodiments of the invention provide a control method, a system and a function entity for reporting a bearer event of a signaling IP flow, to implement reporting of a signaling path status of a signaling IP flow.

To implement the solutions above, a method for reporting a bearer event of a signaling IP flow is provided according to an embodiment of the invention, and the method includes:

sending, by an Application Function, a request for subscribing to a bearer event of a signaling IP flow to a Policy Control and Charging Rules Function, where the request carries flow identifier information such as a 5-tuple and/or other flow identifier information of the signaling IP flow; and receiving, by the Application Function, a bearer event report of the signaling IP flow from the Policy Control and Charging Rules Function, where the bearer event report carries the flow identifier information such as the 5-tuple and/or other flow identifier information of the signaling IP flow.

An Application Function is provided according to another embodiment of the invention, and the Application Function includes:

a first subscription request sending unit adapted to send a request for subscribing to a bearer event of a signaling IP flow to a Policy Control and Charging Rules Function, where the subscription request carries flow identifier information such as a 5-tuple and/or other flow identifier information of the signaling IP flow; and a first bearer event report receiving unit adapted to receive a bearer event report of the signaling IP flow from the Policy Control and Charging Rules Function, where the bearer event report carries the flow identifier information such as the 5-tuple and/or the other flow identifier information of the signaling IP flow.

An Policy Control and Charging Rules Function is provided according to another embodiment of the invention, which includes:

a first subscription request receiving unit adapted to receive a request for subscribing to a bearer event of a signaling IP flow from an Application Function, where the subscription request carries a flow identifier information such as 5-tuple and/or other flow identifier information of the signaling IP flow; and a first bearer report processing unit adapted to generate and send a bearer event report carrying information including Policy Control and Charging rules names associated with the bearer event corresponding to the flow identifier information such as the 5-tuple and/or the other flow identifier information of the signaling IP flow.

A system for reporting a bearer event of a signaling IP flow is provided according to another embodiment of the invention, and the system includes an Application Function and a Policy Control and Charging Rules Function:

The Application Function includes:

a first subscription request sending unit adapted to send a request for subscribing to a bearer event of a signaling IP flow to a Policy Control and Charging Rules Function, where the subscription request carries flow identifier information such as a 5-tuple and/or other flow identifier information of the signaling IP flow; and a first bearer event report receiving unit adapted to receive a bearer event report of the signaling IP flow sent by the Policy Control and Charging Rules Function, where the bearer event report carries the flow identifier information such as the 5-tuple and/or the other flow identifier information of the signaling IP flow.

The Policy Control and Charging Rules Function includes:

a first subscription request receiving unit adapted to receive from the first subscription request sending unit the request for subscribing to the bearer event of the signaling IP flow, where the subscription request carries flow identifier information such as a 5-tuple and/or the flow identifier information of the signaling IP flow; and a first bearer report processing unit adapted to generate and send the bearer event report carrying information including Policy Control and Charging rule names associated with the bearer event corresponding to the flow identifier information such as the 5-tuple and/or the other flow identifier information of the signaling IP flow.

With the control method, system and function entity for reporting a bearer event of an IP flow provided according to the embodiments of the invention, flow identifier information such as a 5-tuple is generated for a signaling IP flow and a media IP flow respectively, so that the mechanism for reporting a signaling path status is not limited by the parameter of Flow Usage, the PDP context with a signaling tag, etc., thereby reporting the signaling path status of a signaling IP flow and unifying a mechanism for reporting a signaling path status and a mechanism for reporting a bearer event of a media IP flow, and further establishing corresponding PCC rules for signaling and the association between an signaling IP flow and a bearer.

DETAILED DESCRIPTION OF PREFERRED EMBODIMENTS

Figure 1:
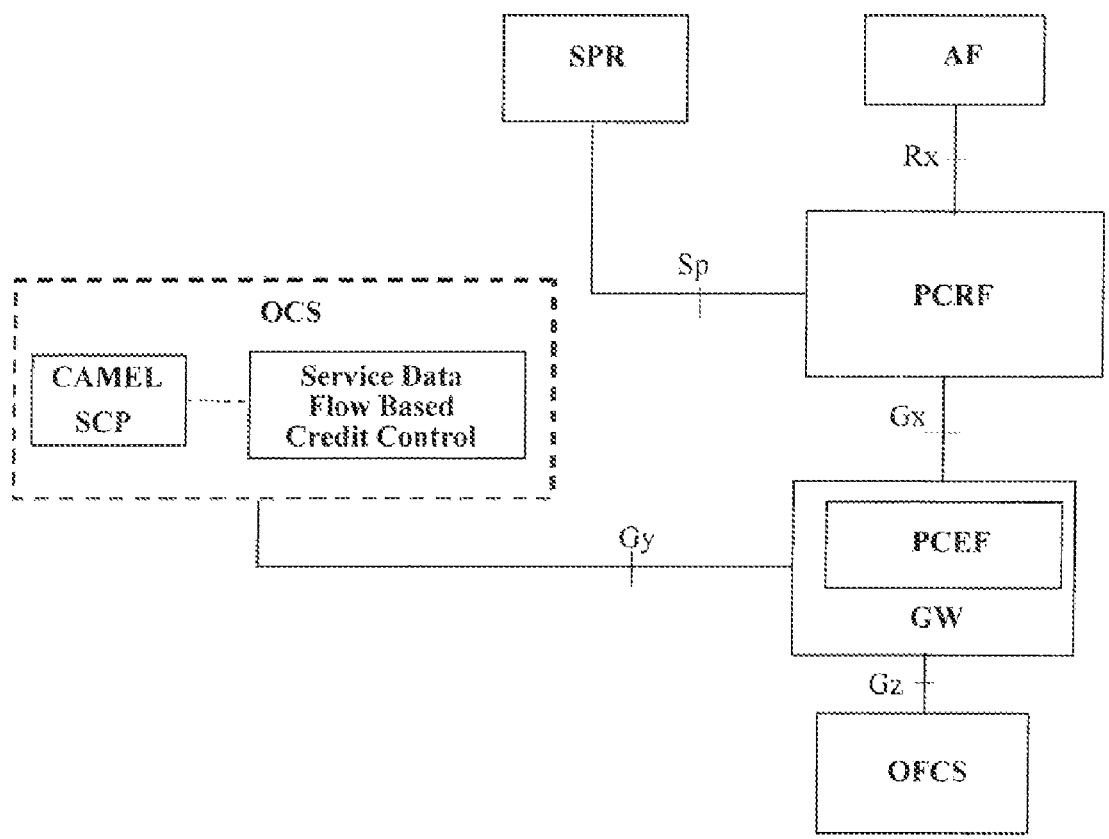
FIG. 1 is a schematic diagram of a configuration of the PCC architecture in the prior art.
Figure 2:
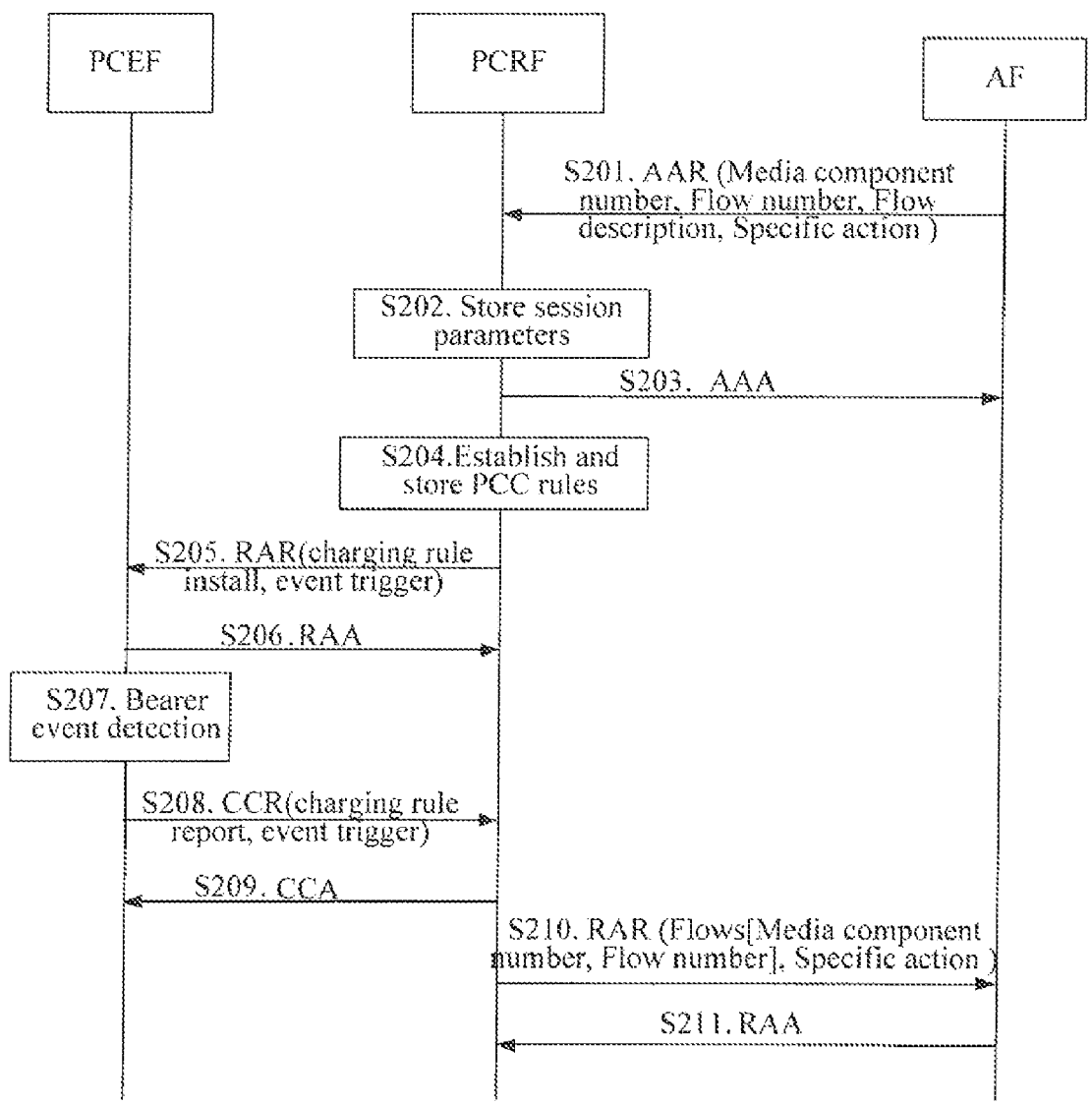
FIG. 2 is a schematic flowchart of a mechanism for subscribing to and reporting a media bearer event in the prior art.
Figure 3:
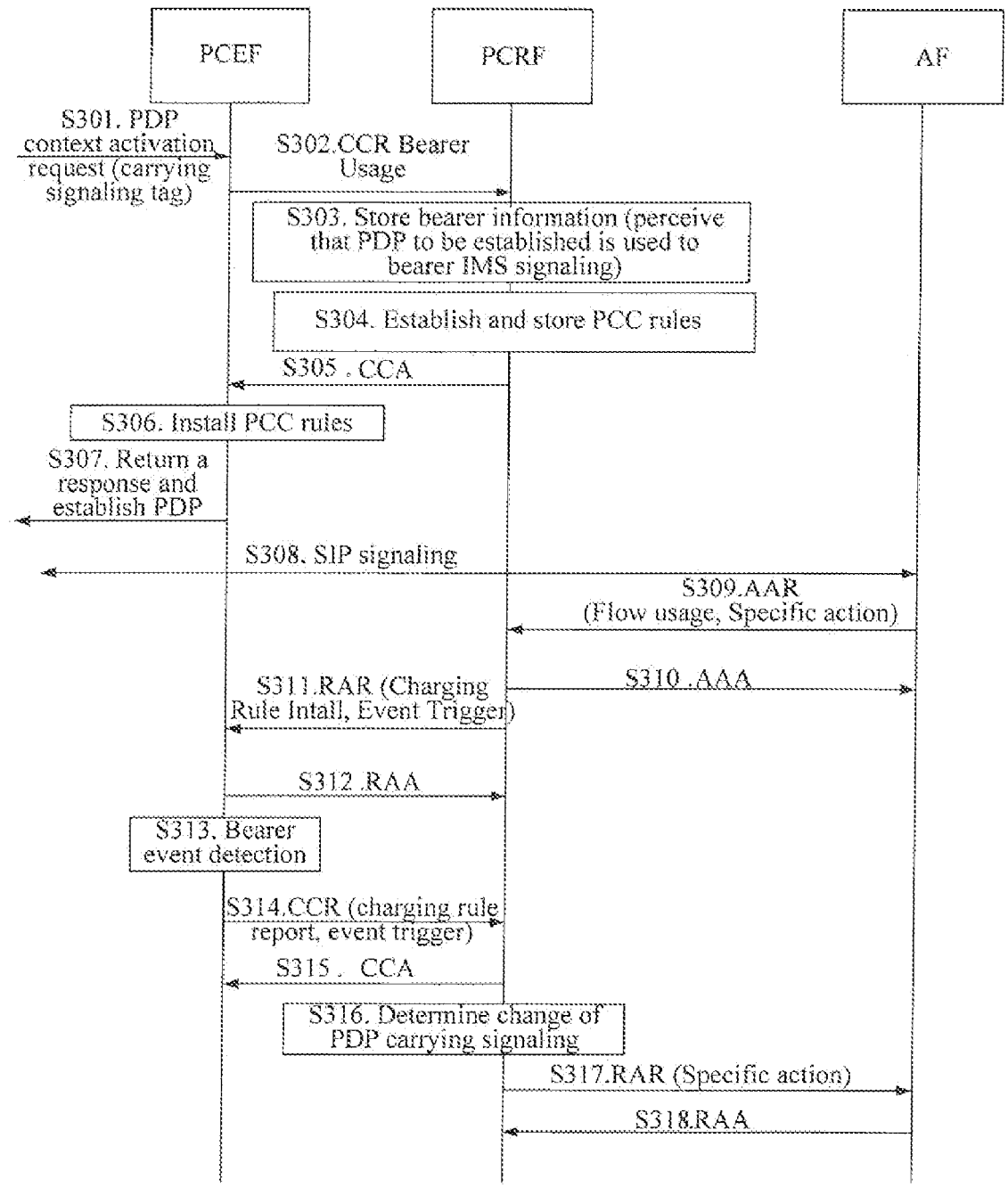
FIG. 3 is a schematic flowchart of a mechanism for reporting a signaling path status in the prior art.

With insight into the existing mechanism for reporting a media bearer event and the mechanism for reporting a signaling path status in the Background of the Invention, it can be seen that an application scenario of the existing mechanism for reporting a signaling path status is limited in numerous aspects as follows.

An implementation of the existing mechanism for reporting a signaling path status is dependent upon the parameter of Flow Usage. Upon initiating a subscription to a signaling path status, the service layer uses the parameter of Flow Usage as an AF signaling identifier to notify the PCRF of the signaling-related subscription. As defined currently, however, the parameter of Flow Usage exists as a sub-parameter of a parameter of Media Sub-Component, and the parameter of Flow Usage has to be used along with the parameters of Media Component Description and Media Sub-Component. For a signaling IP flow, no value of the parameter of Media Component Description or the parameter of Media Sub-Component is defined in the existing standard, as a result, no signaling information is allowed to be sent or reported, and consequently, no mechanism for reporting a signaling path status can be implemented.

An implementation of the existing mechanism for reporting a signaling path status is also dependent upon establishment of a PDP context with a signaling tag, and an application scenario in which a signaling-bearing PDP context without signaling tag is not supported. A signaling tag needs to be carried during establishment of the PDP context, so that the PCRF may perceive which PDP channel is used to bear signaling. When the bearer is changed subsequently, the PCRF may determine that the signaling-bearing PDP context is changed in accordance with PCC rule names corresponding to the bearer, thereby implementing reporting of a signaling path. However, the establishment of a PDP context with a signaling tag relies on the support by UE capabilities and the operator. In other words, an application scenario where a PDP context which bears signaling is without signaling tag may be present among practical network applications. Consequently, no mechanism for reporting a signaling path status can be implemented in the application scenario where a PDP context is provided with no signaling tag.

An implementation of the existing mechanism for reporting a signaling path status is also dependent upon associated PCC rules generated during establishment of a PDP context. If no associated PCC rule is generated during establishment of the PDP context which bears signaling, the address and port information of a signaling IP flow at the service layer can not be sent to the PCRF during a session in accordance with the existing mechanism, and consequently no signaling-related PCC rule can be established, as a result, the PCEF can not report any bearer event to the PCRF and no signaling path status reporting can be implemented.

Furthermore, the existing mechanism for reporting a signaling path status is independent of the mechanism for reporting a media bearer event, as a result, the entire mechanism for reporting a bearer event is complex. Furthermore, in the mechanism for reporting a signaling path status, no 5-tuple for signaling IP flow that is corresponding to a signaling IP flow at the service layer is generated, consequently no association between the signaling IP flow and a bearer can be established.

In view of the drawbacks present in the existing mechanism for reporting a signaling path status, according to an embodiment of the invention, there is provided a control method for reporting a signaling path status of a signaling IP flow, and the method combines a mechanism for reporting a signaling path status and a mechanism for reporting a media bearer status, so that a bearer reporting mechanism is simplified, and an application of the mechanism for reporting a signaling path status is not limited by, for example, the parameter of Flow Usage, provision of a signaling tag for a PDP context and the necessity of generating associated PCC rules during establishment of a PDP context.

In an embodiment of the invention, the control method for reporting a bearer event includes the following steps.

1. For each IP flow for which a request for a subscription to a bearer event report is triggered, an AF generates flow identifier information such as a 5-tuple, and generates flow identifier information in accordance with the type of the IP flow. The IP flow may include a signaling IP flow and a media IP flow, and both the flow identifier information such as the 5-tuple and/or the other flow identifier information may identify the IP flow and the type of the IP flow.

2. The AF sends to a PCRF the request for subscribing to a bearer event of the IP flow. The subscription request carries the flow identifier information (such as 5-tuple and the other flow identifier information).

3. The PCRF establishes PCC rule information including PCC rules and PCC rule names that is associated with the bearer of the IP flow, stores the PCC rule names and the flow identifier information correspondingly, and sends the PCC rule information to a PCEF.

In some application scenarios, the associated PCC rule information is already established for the IP flow bearer and sent to the PCEF during negotiation of a PDP context or a session. In this case, there is already PPC rule information available for the IP flow, and the PCRF need not establish and send any PCC rule information associated with the IP flow bearer, but stores the generated PCC rule names and flow identifier information.

4. The PCEF installs the PCC rule, and upon detection of a bearer event, reports the PCC rule names and the detected bearer event to the PCRF.

5. The PCRF obtains the flow identifier information in accordance with the associated PCC rule names, and the obtained flow identifier information is sent to the AF in a bearer event report.

6. The AF determines the type of the received bearer event report in accordance with the information carried in the bearer event report, where the type of a bearer event report of the signaling IP flow is a signaling path status report and the type of a bearer event report of a media IP flow is a media bearer event report.

In step 5, flow identifier information such as a corresponding 5-tuple may also be carried in the bearer event report and transmitted to the AF, and in step 6, the AF determines the type of the received bearer event report in accordance with the flow identifier information (such as the 5-tuple).

In the embodiment of the invention, the mechanism for reporting a signaling path status and the mechanism for reporting a bearer event of a media IP flow is unified, and signaling information is sent by the service layer, so that the mechanism for reporting a signaling path status is not limited by the parameter of Flow Usage, provision of a signaling tag for a PDP context and the like, thus establishing for signaling IP flow a PCC rule and the association between an signaling IP flow and a bearer.

In an embodiment of the invention, the AF need not notify the PCRF that whether a signaling IP flow or a media IP flow is involved upon sending service information to the PCRF, thus hiding the flow type from being perceived by the PCRF. Upon detection of a subscribed bearer event, the PCEF reports PCC rule names related to the bearer to the PCRF, and the PCRF determines flow identifier information in accordance with the PCC rule names and reports the flow identifier information and the bearer event to the AF. The AF determines the type of the bearer event report in accordance with a generation rule of the flow identifier information, and responds appropriately.

In a further embodiment of the invention, the mechanism for reporting a bearer event is independent of the type of an established PDP context. The AF at the service layer plane generates flow identifier information such as a 5-tuple for a signaling IP flow and a media IP flow in accordance with a uniform rule, and indicates the specific flow identifier information (such as a 5-tuple) when subscribing to a bearer event corresponding to a flow from the PCRF. The PCRF establishes the association between the bearer and the PCC rule in accordance with the flow identifier information (such as the above-referenced 5-tuple) and sends the association to the PCRF. When a bearer event occurs, the PCEF reports the PCC rule names associated with the bearer and the bearer event.

In yet a further embodiment of the invention, flow identifier information such as 5-tuple and/or other flow identifier information may be generated as follows: the flow identifier information such as a 5-tuple and/or other flow identifier information of a media IP flow is derived from the SDP for session negotiation. The flow identifier information (such as 5-tuple) of a signaling IP flow is generated in accordance with information in a SIP message, such as a source IP address, a destination IP address, a port number and a protocol adopted. With reference to a media component number of a media IP flow, which is started from 1 and used for identifying in an ascending order, a signaling IP flow may be provided with a default media component number 0, for example, <0, 1> is used to indicate a signaling IP flow.

Figure 4:
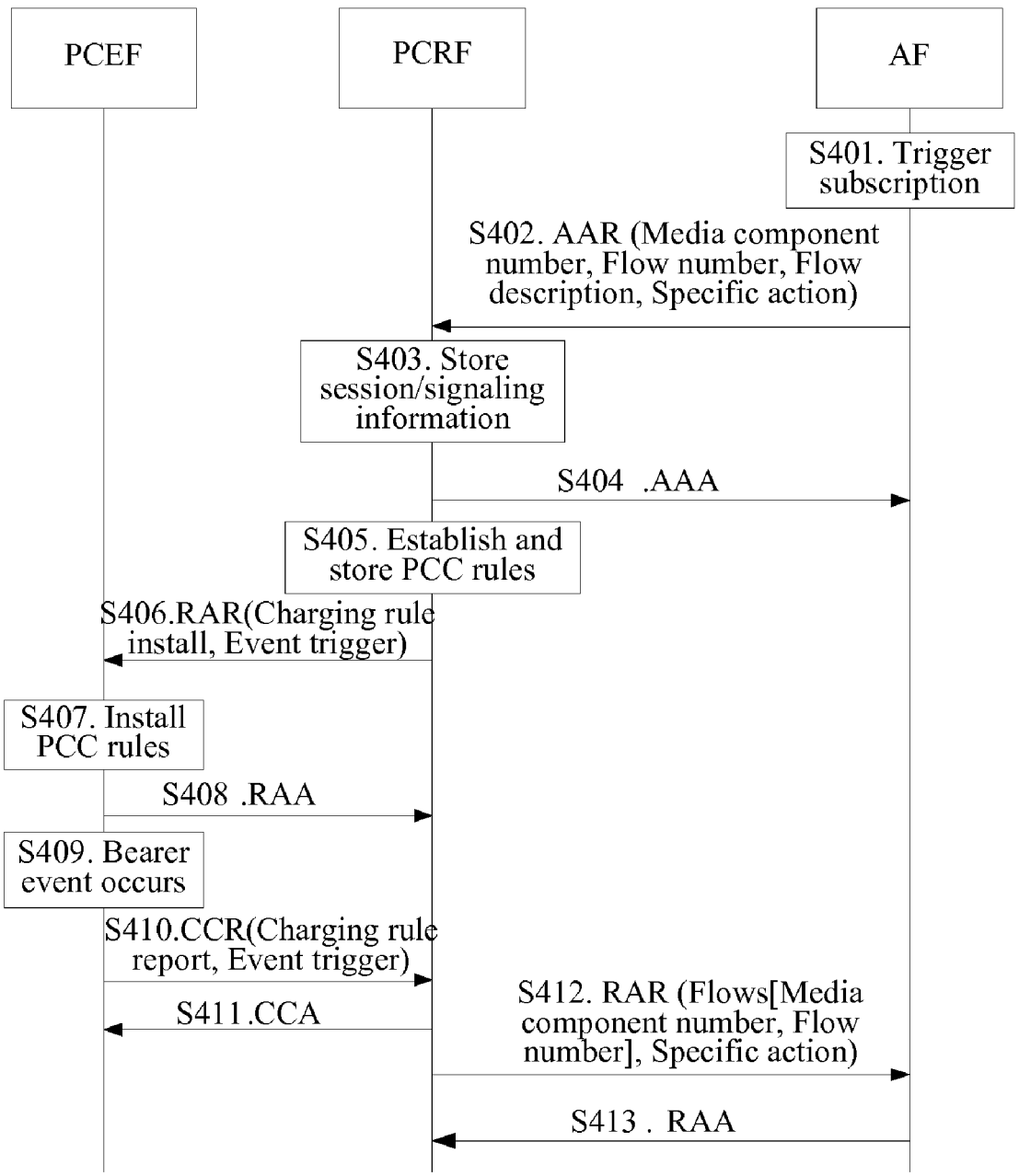
FIGS. 4 and 5 each are a schematic flowchart of a control method for reporting a bearer event of a signaling IP flow according to an embodiment of the invention.

With reference to FIG. 4, a method for reporting a signaling path status according to an embodiment of the invention is shown. The control method according to the embodiment of the invention is independent of PDP context establishment. A subscription procedure and a reporting procedure are shown in FIG. 4, where the steps S401-S409 illustrate a subscription procedure and are described as follows.

Step S401. An AF initiates a subscription to a signaling path status upon receiving a trigger for the subscription, for example, when a registration message arrives at the AF and the AF is required to subscribe to a signaling path status, or during session negotiation.

Step S402. For unification of the mechanism for reporting a media bearer event and the mechanism for reporting a signaling path status, upon subscribing to a bearer event corresponding to a signaling IP flow, the AF generates a signaling IP flow such as a 5-tuple and/or other flow identifier information for the signaling IP flow, and flow identifier information (a media component number and a flow number) and the signaling IP flow 5-tuple as well as the specific subscribed bearer event indicated by the parameter of specific action are carried in the AAR.

Steps S403-S404. The PCRF stores the received service layer information and returns an AAA to the AF.

Step S405. The PCRF establishes and stores PCC rule information of the signaling IP flow in accordance with the received service layer information (the signaling IP flow (such as 5-tuple), QoS information, etc.), bearer information (provided by the PCEF during PDP establishment), a subscription profile and an operator policy, where the PCC rule information includes PCC rules and the corresponding PCC rule names. Further, if the PCRF determines that there exist already PCC rules and PCC rule names available for the signaling IP flow, the PCRF sends the PCC rules and the PCC rule names to the PCEF.

Step S406. The PCRF sends to the PCEF an RAR message which carries the PCC rule information in a parameter of Charging Rule Install.

If the PCRF has subscribed previously to a bearer event reporting procedure from the PCEF, the PCRF need not initiate again any subscription from the PCEF; otherwise, the PCRF need initiate a subscription to a bearer event from the PCEF. As illustrated in FIG. 4, the subscription to a bearer event and the sending of the PCC rule information may be performed together through the same RAR message, and in the RAR message, the parameter of Event Trigger corresponding to the parameter of specific action is carried for specifying the bearer event to which the subscription from the PCEF is made.

Steps S407-S408. The PCEF installs the PCC rule information and returns an AAA to the PCRF.

In the above subscription procedure, the AF subscribes to a bearer event report of the signaling IP flow with the use of the generated flow identifier information such as 5-tuple and flow identifier information of the signaling IP flow, so that the service layer can initiate a subscription to a signaling path status independently of the parameter of Flow Usage.

Further, the PCRF establishes and stores the PCC rule information in accordance with the received service layer information (flow identifier information such as the 5-tuple of the signaling IP flow, the QoS information, etc.), the bearer information (provided by the PCEF during PDP establishment), the subscription profile and the operator policy, thereby ensuring that a PDP context of each signaling IP flow is associated with PCC rules. Practically, if the PCRF established and stored previously the PCC rule information, the PCRF sends directly the established PCC rule information to the PCEF. Upon detection of the bearer event subscribed to by the PCRF, the PCEF reports the PCC rule names associated with the detected bearer event and the detected bearer event to the PCRF. In other words, if there is PCC rule information available for the signaling IP flow, no establishment or storage of PCC rule information needs to be performed in the present step, but the PCC rule names and the 5-tuple of the IP flow need to be associated and stored.

Steps S409-S413 illustrate a procedure of reporting a bearer event and are described particularly as follows.

Step S409. The PCEF detects an event related to the bearer.

Steps S410-S411. Upon detection of the event related to the bearer, the PCEF reports the PCC rule names associated with the bearer to the PCRF.

Steps S412-S413. In accordance with the PCC rule names, the PCRF reports to the AF about the corresponding flow identifier information along with the bearer event via a bearer event report, and the AF returns an RAA response to the PCRF upon the receipt of the report.

Furthermore, the AF determines the type of the IP flow associated with the reported bearer event in accordance with the flow identifier information in the bearer event report. If the flow identifier information indicates a signaling IP flow, a signaling path status report is determined; otherwise a media bearer event report is determined.

In the procedure of reporting an event related to the bearer, the PCEF and the PCRF need not distinguish an IP flow type, thereby unifying the reporting mechanisms and associating the signaling IP flow and the bearer event.

Figure 5:
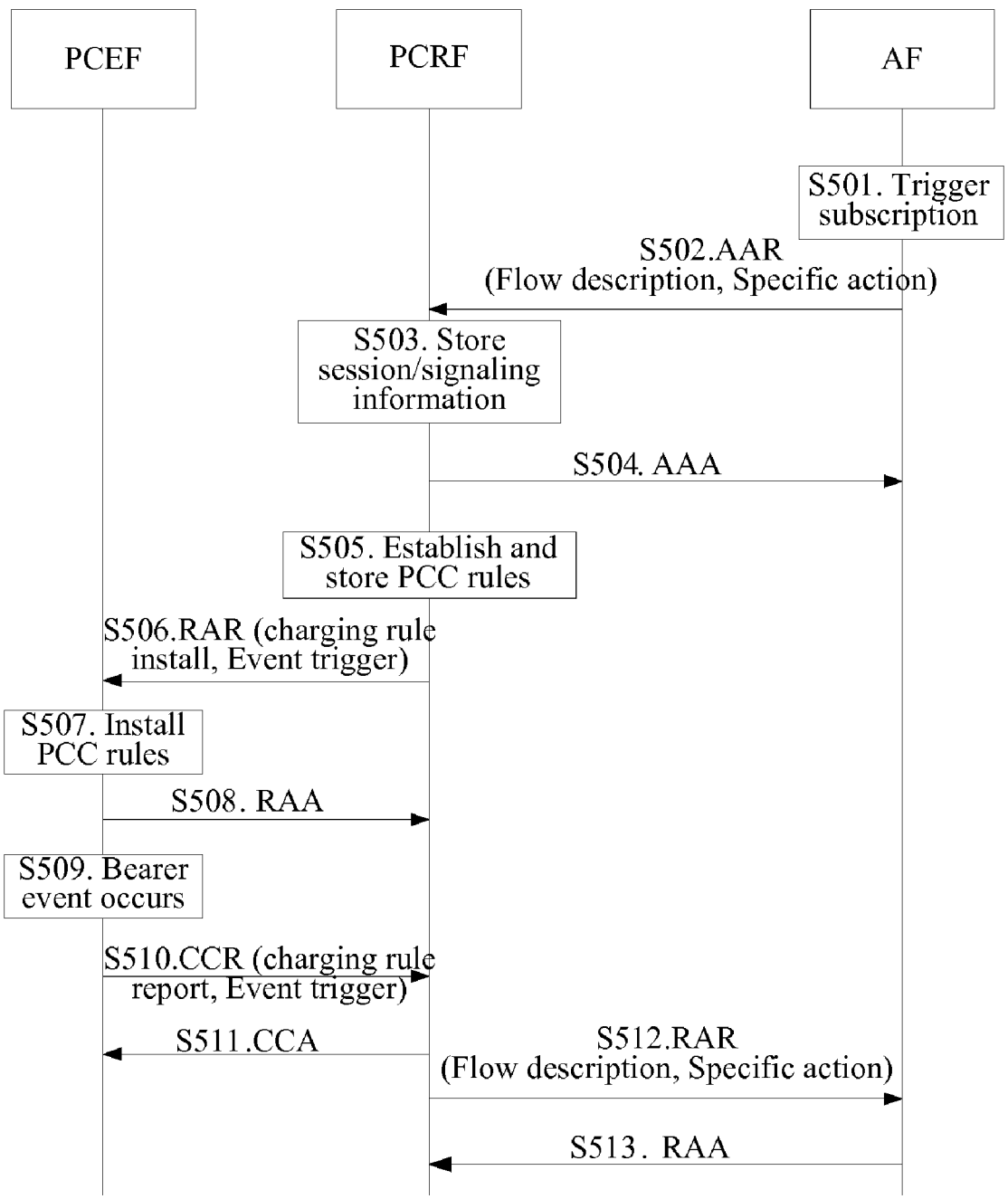

With reference to FIG. 5, another embodiment of the invention is illustrated. The function of the flow identifier information to identify uniquely an IP flow may be implemented by a 5-tuple.

Step S502. The AF may not issue any flow identifier information upon subscribing to a bearer event corresponding to an IP flow.

Step S512. The PCRF reports a 5-tuple of the signaling IP flow along with the bearer event to the AF in accordance with PCC rule names, and the AF returns an RAA response to the PCRF.

The AF determines the type of the IP flow associated with the reported bearer event in accordance with flow identifier information corresponding to the 5-tuple. If the flow identifier information corresponds to a signaling IP flow, a signaling path status report is determined; otherwise, a media bearer event report is determined.

The other steps are the same as those in the flow illustrated in FIG. 4, and descriptions thereof are not stated again.

According to an embodiment of the invention, after defining flow identifier information such as a 5-tuple and values of a media component number and a flow number for a signaling IP flow, signaling information may be sent from the service layer, so that the subscription and reporting procedure may be embodied.

In an embodiment of the invention, flow identifier information such as a 5-tuple is generated consistently for a signaling IP flow and a media IP flow, so that during a session, PCC rules may be established for the signaling IP flow and the signaling IP flow may be bound to a bearer. Thus, a signaling path status can be reported without any limitation of a PDP type.

In an embodiment of the invention, service layer signaling information may be sent to establish PCC rules corresponding to the signaling in real time, thereby establishing the association between a signaling IP flow and a bearer.

In a further embodiment of the invention, to subscribe to a bearer event, the PCRF need not be notified about the signaling-related subscription; and upon detection of the bearer event, the PCRF need not perceive whether the related subscription is a signaling-related subscription or a media-related subscription, but reports the 5-tuple or flow identifier information corresponding to the bearer to the AF. The AF checks whether the report relates to reporting of a media bearer event or a signaling path status. In other words, the flow type is perceived by the AF instead of the PCRF, so that the mechanism for reporting a signaling path status and the mechanism for reporting a media bearer event are unified.

As can be seen from the above, a universal, simple and efficient control method for reporting a bearer event is provided according to the embodiment of the invention, and the mechanism for reporting a signaling path status and the mechanism for reporting a media event of a media IP flow are unified, thereby improving the mechanism for reporting a signaling path status and ensuring implementation of a signaling path status report.

Figure 6:
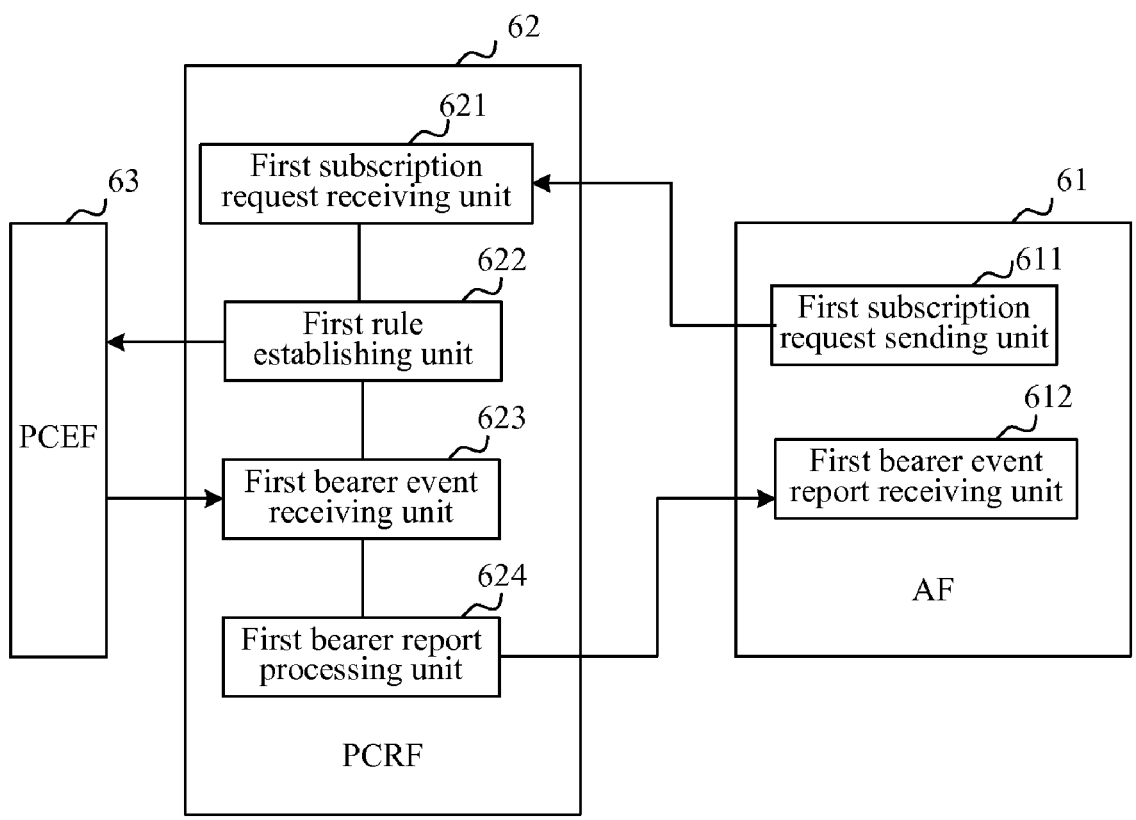
FIGS. 6 and 7 each are a schematic diagram of a general configuration of a control system for reporting a bearer event of a signaling IP flow according to an embodiment of the invention.

As illustrated in FIG. 6, a control system for implementing the control method illustrated in FIG. 4 according to a further embodiment of the invention is shown, and the control system includes an AF 61, a PCRF 62 and a PCEF 63. The embodiment is illustrated by way of an example in which flow identifier information such as a 5-tuple of an IP flow is carried, but the invention is not limited to this. For example, a 5-tuple or both a 5-tuple and flow identifier information may be carried. The AF 61 includes:

a first subscription request sending unit 611 adapted to send a request for subscribing to a bearer event of a signaling IP flow from the Policy Control and Charging Rules Function, where the subscription request carries flow identifier information such as a 5-tuple of the signaling IP flow; and a first bearer event report receiving unit 612 adapted to receive a bearer event report of the signaling IP flow from the Policy Control and Charging Rules Function, where the bearer event report carries flow identifier information (such as the 5-tuple) of the signaling IP flow.

The PCRF 62 primarily includes a first subscription request receiving unit 621 and a first bearer report processing unit 624 and preferably a first rule establishing unit 622 and a first bearer event receiving unit 623.

The first subscription request receiving unit 621 is adapted to receive the request for subscribing to the bearer event of the signaling IP flow from an Application Function. The subscription request includes the 5-tuple of the signaling IP flow.

The first rule establishing unit 622 is adapted to establish Policy Control and Charging rules and names of the Policy Control and Charging rules corresponding to the signaling IP flow in accordance with flow identifier information (such as the 5-tuple) of the signaling IP flow, and send the PCC rules and the PCC rule names to the Policy and Charging Enforcement Function.

The first bearer event receiving unit 623 is adapted to receive the detected bearer event and the Policy Control and Charging rule names associated with the detected bearer event from the Policy and Charging Enforcement Function.

The first bearer report processing unit 624 is adapted to generate and send a bearer event report carrying the flow control information of the signaling IP flow. The flow control information may be the 5-tuple of the signaling IP flow corresponding to the Policy Control and Charging rule names associated with the bearer event.

Preferably, the PCRF 62 further includes a determination unit (not shown) adapted to instruct the first rule establishing unit to establish Policy Control and Charging rules and names of the Policy Control and Charging rules corresponding to the IP flow, upon determining that no Policy Control and Charging rule or Policy Control and Charging rule name is available for the signaling IP flow carried in the subscription request; or upon determining that there exist Policy Control and Charging rules and Policy Control and Charging rule names available for the signaling IP flow carried in the subscription request, send the charging rules and the charging rule names to the Policy and Charging Enforcement Function.

According to an embodiment of the invention, there is further provided an Application Function including a first subscription request sending unit and a first bearer event report receiving unit. The first subscription request sending unit is adapted to send a request for subscribing to a bearer event of a signaling IP flow to a Policy Control and Charging Rules Function, and the subscription request carries a 5-tuple and/or flow identifier information of the signaling IP flow; and the first bearer event report receiving unit is adapted to receive a bearer event report of the signaling IP flow from the Policy Control and Charging Rules Function, and the bearer event report carries the 5-tuple and/or the flow identifier information of the signaling IP flow.

The implementation of the Application Function is the same as that in the above method and system and descriptions thereof are not given herein again.

According to another embodiment of the invention, there is provided a Policy Control and Charging Rules Function including a first subscription request receiving unit and a first bearer report processing unit. The first subscription request receiving unit is adapted to receive a request for subscribing to a bearer event of a signaling IP flow from an Application Function, and the subscription request carries flow identifier information such as a 5-tuple and/or ther flow identifier information of the signaling IP flow; and the first bearer report processing unit is adapted to generate and return a bearer event report carrying such information as Policy Control and Charging rule names associated with the bearer event corresponding to the 5-tuple and/or the other flow identifier information of the signaling IP flow.

Preferably, the Policy Control and Charging Rules Function may further include:

a first rule establishing unit adapted to establish the Policy Control and Charging rules and the Policy Control and Charging rule names corresponding to the signaling IP flow in accordance with flow identifier information such as a 5-tuple and/or other flow identifier information of the signaling IP flow, and send the Policy Control and Charging rules and the Policy Control and Charging rule names to a Policy and Charging Enforcement Function; and a first bearer event receiving unit adapted to receive the detected bearer event and the Policy Control and Charging rule names associated with the detect bearer event from the Policy and Charging Enforcement Function.

Preferably, the Policy Control and Charging Rules Function may further include:

a determination unit adapted to instruct the first rule establishing unit to establish Policy Control and Charging rules and Policy Control and Charging rule names corresponding to the IP flow, upon determining that no Policy Control and Charging rule or Policy Control and Charging rule name is available for the signaling IP flow carried in the subscription request; or upon determining that there exist Policy Control and Charging rules and Policy Control and Charging rule names available for the signaling IP flow carried in the subscription request, send the charging rules and the charging rule names to the Policy and Charging Enforcement Function.

The implementation of the Application Function is the same as that in the above method and system and descriptions thereof are not given herein again.

Figure 7:
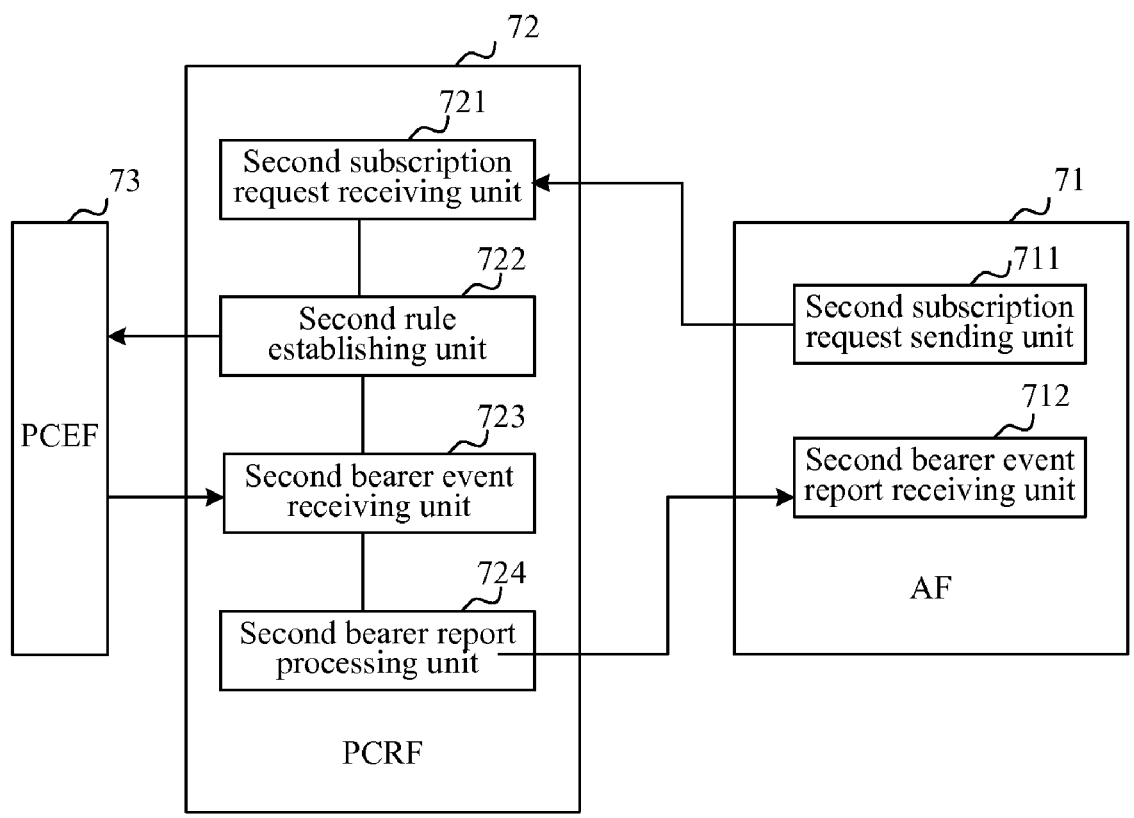

With reference to FIG. 7, a control system for implementing the control method illustrated in FIG. 5 is provided according to yet another embodiment of the invention, and the control system includes an AF 71, a PCRF 72 and a PCEF 73, and the AF 71 primarily includes:

a second subscription request sending unit 711 adapted to send a request for subscribing to a bearer event of a signaling IP flow to the Policy Control and Charging Rules Function, where the subscription request carries flow identifier information such as a 5-tuple of the signaling IP flow and flow identifier information of the signaling IP flow (this embodiment is illustratively described with, but not limited to the 5-tuple of the signaling IP flow and the flow identifier information of the signaling IP flow); and a second bearer event report receiving unit 712 adapted to receive a bearer event report of the signaling IP flow from the Policy Control and Charging Rules Function, where the bearer event report carries the flow identifier information of the signaling IP flow.

The PCRF 72 primarily includes:

a second subscription request receiving unit 721 adapted to receive the request for subscribing to the bearer event of the signaling IP flow from the Application Function, where the subscription request carries the flow identifier information (such as 5-tuple) of the signaling IP flow and the flow identifier information of the signaling IP flow;

a second rule establishing unit 722 adapted to establish Policy Control and Charging rules and Policy Control and Charging rule names corresponding to the signaling IP flow in accordance with the flow identifier information (such as 5-tuple) of the signaling IP flow, and send the Policy Control and Charging rules and Policy Control and Charging rule names to the Policy and Charging Enforcement Function (optionally);

a second bearer event receiving unit 723 adapted to receive the detected bearer event and the Policy Control and Charging rule names associated with the detected bearer event from the Policy and Charging Enforcement Function (optionally); and a second bearer report processing unit 724 adapted to generate and send the bearer event report carrying the flow identifier information of the signaling IP flow, where the identifier information may be the flow identifier information of the signaling IP flow corresponding to the Policy Control and Charging rule names associated with the bearer event.

A method for reporting a signaling IP flow path status is provided according to yet another embodiment of the invention. In the method, for a request of activating the first default PDP context from an IP Connectivity Access Network (IP-CAN) session, PCC rules are activated or installed in advance for the default PDP context; if the IP-CAN session requests again establishing a dedicated PDP context for a signaling IP flow, the previous PCC rules for the default PDP context are deactivated or deleted and PCC rules are activated or installed for the PDP context of the signaling IP flow, and thus an IP signaling path status report is triggered in accordance with rule names of the PCC rules newly activated or installed for the PDP context of the signaling IP flow; otherwise if the default PDP context is used to bear the signaling IP flow, an IP signaling path status report may be triggered in accordance with rule names of the PCC rules activated or installed in advance for the default PDP context.

The PCC rules activated or installed in advance for the default PDP context and the PCC rules newly activated or installed for the PDP context of the signaling IP flow may be generated in the following methods.

1. A Predefinition Method

Predefined PCC rules are arranged in the PCEF for the signaling IP flow. Upon each receipt of a request for activating the default PDP context or a request for activating the PDP context of the signaling IP flow, the PCRF activates the predefined PCC rules for the PDP context. In this method, the predefined PCC rules and names thereof are fixed, and the address of an AF for processing IP signaling, which is included in the predefined PCC rules is also fixed. If the address of the AF for processing IP signaling is modified, predefined PCC rules are regenerated and updated in synchronization to the PCEF and the PCRF.

2. A Dynamic Generation Method

The PCRF is preconfigured with the address of the AF for processing IP signaling. Upon each receipt of a request for activating the default PDP context or a request for activating the PDP context of the signaling IP flow, the PCRF generates signaling PCC rules including the preconfigured address of the AF for processing IP signaling and sends the signaling PCC rules to the PCEF for installing.

The above two methods may be used in combination or separately, and detailed descriptions thereof will be presented below in an embodiment with reference to the drawings.

Figure 8:
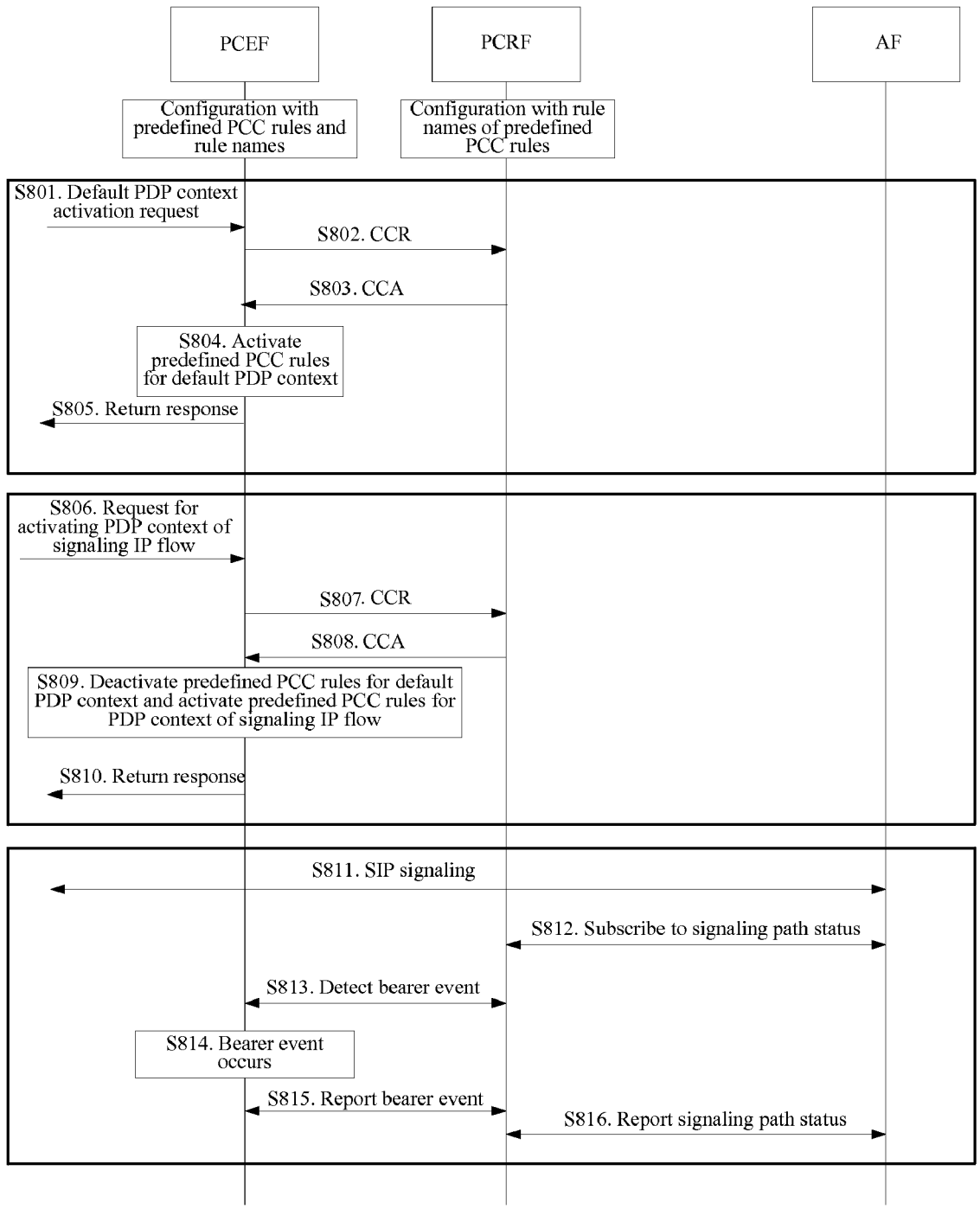
FIGS. 8, 9 and 10 each are a schematic flowchart of a method for reporting a signaling IP flow path status according to an embodiment of the invention.

With reference to FIG. 8, a mechanism for reporting a signaling IP flow path status in the first predefinition method in which PCC rules are predefined is shown, where the PCEF is configured with the predefined PCC rules and the PCRF is configured with names of the predefined PCC rules, and a specific flow of the mechanism includes the following.

Steps S801-S805 illustrate a procedure of activating a default PDP context and activating the predefined PCC rules for the default PDP context, and are described particularly as follows.

Step S801. The PCEF receives a request for activating the default PDP context from a UE.

Step S802. The PCEF sends to the PCRF a CCR message including identifier information of the default PDP context.

Step S803. Via a CCA message, the PCRF instructs the PCEF to activate the predefined PCC rules for the default PDP context, where the CCA message includes the identifier information of the fault PDP context and the predefined PCC rule names.

Step S804. The PCEF receives the CCA message and activates the predefined PCC rules for the default PDP context.

Step S805. The PCEF returns a default PDP context activation response to the UE.

Thereafter, the user may initiate a request for activating a dedicated PDP context of a signaling IP flow. Steps S806-S810 illustrate a procedure of establishing a PDP context of a signaling IP flow, deactivating the predefined PCC rules for the default PDP context and activating predefined PCC rules for the PDP context of the signaling IP flow, and are described particularly as follows.

Step S806. The PCEF receives a request for activating a PDP context from the UE, where the request carries a signaling tag.

Step S807. The PCEF sends to the PCRF a CCR message including the parameter of Bearer Usage and an identifier of the PDP context of the signaling IP flow, where the parameter of Bearer Usage includes signaling tag information.

Step S808. The PCRF perceives that the PDP context to be established is used to bear signaling in accordance with the signaling tag information in the parameter of Bearer Usage, and instructs, via a CCA message, the PCEF to deactivate the predefined PCC rules for the default PDP context and activate predefined PCC rules for the PDP context of the signaling IP flow, where the CCA message includes: the identifier of the PDP context of the signaling IP flow and predefined PCC rule names; and the identifier of the default PDP context and predefined PCC rule names.

Step S809. The PCEF receives the CCA message, deactivates the predefined PCC rules for the default PDP context and activates the predefined PCC rules for the PDP context of the signaling IP flow.

Step S810. The PCEF returns a signaling IP flow PDP context activation response to the UE.

Steps S811-S816 illustrate a procedure of subscribing to a signaling IP flow path status report and reporting the signaling IP flow path status, and are described particularly as follows.

Step S811. The AF processes SIP signaling from the UE.

Step S812. The AF subscribes to a signaling IP flow path status from the PCRF.

Step S813. The PCRF subscribes to an event related to the bearer of the PDP context from the PCEF.

Step S814. A bearer event of the PDP context corresponding to the predefined PCC rules is detected by the PCEF.

Step S815. The PCEF sends to the PCRF a PDP bearer event detection report carrying the corresponding bearer event and the predefined PCC rule names.

Step S816. The PCRF sends a signaling IP flow signaling path status report to the AF.

Therefore, if the UE initiates subsequently no request for activating the PDP context of the signaling IP flow, session signaling is borne in the default PDP context, and the mechanism for reporting a signaling IP flow path status is implemented by the predefined PCC rules and the predefined PCC rule names for the default PDP context; if a request for activating the PDP context of the signaling IP flow is initiated, the session signaling is borne in the dedicated PDP context of the signaling IP flow, and the mechanism for reporting a signaling IP flow path status is implemented by the predefined PCC rules and the predefined PCC rule names for the PDP context of the signaling IP flow.

Figure 9:
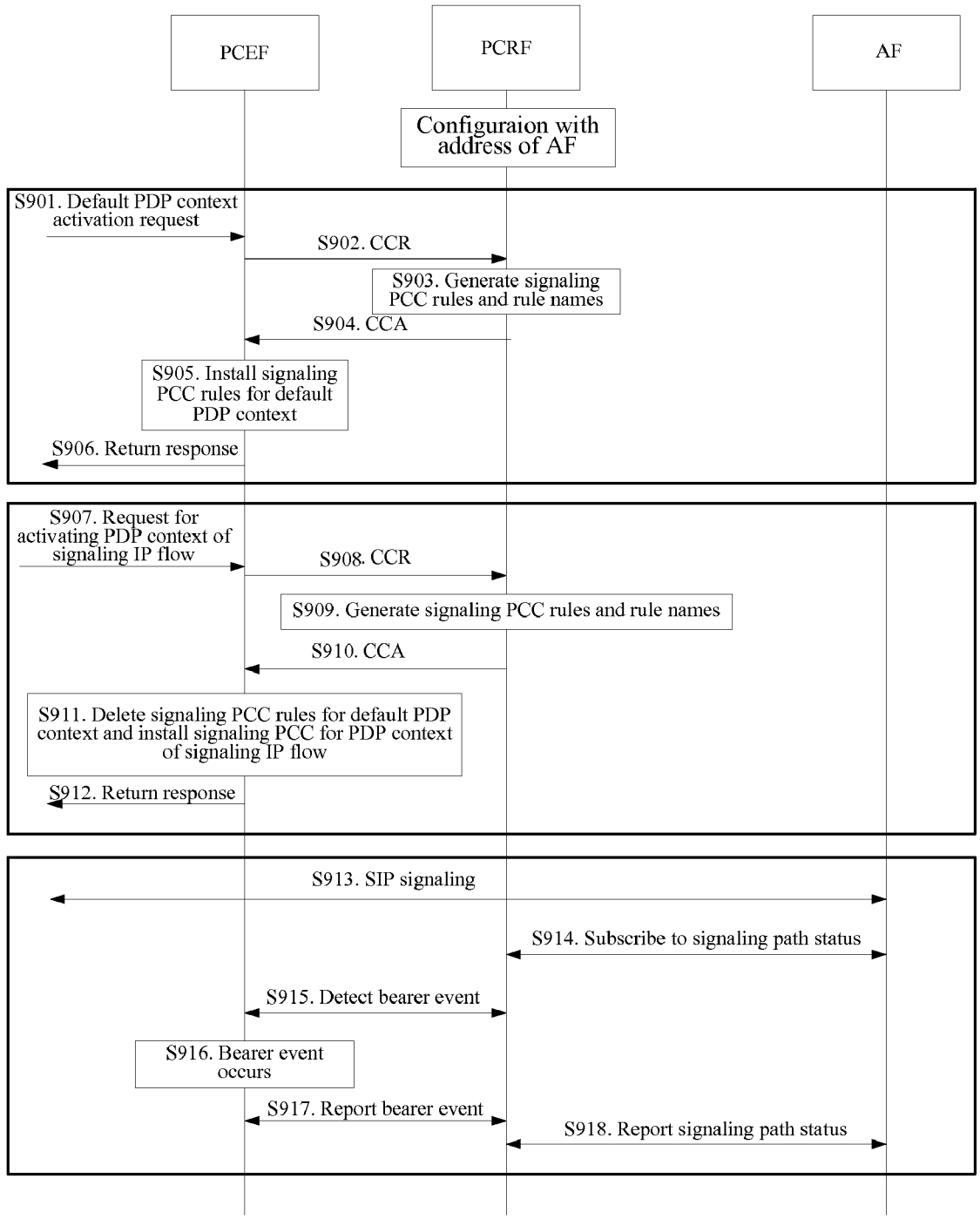

With reference to FIG. 9, a mechanism for generating signaling PCC rules and names thereof and reporting a signaling IP flow path status in the second method is illustrated, in the mechanism, the PCRF is configured with an address of an AF for processing SIP signaling for the UE, and a specific flow of the mechanism includes the following.

Steps S901-S906 illustrate a procedure of establishing the default PDP context and installing the signaling PCC rules and names thereof for the default PDP context, and are described as follows.

Step S901. The PCEF receives a request for activating the default PDP context sent from the UE.

Step S902. The PCEF sends to the PCRF a CCR message including identifier information of the default PDP context.

Step S903. The PCRF generates signaling PCC rules including the address of the AF.

Step S904. Via a CCA message, the PCRF instructs the PCEF to install the signaling PCC rules for the default PDP context, where the CCA message includes the identifier information of the default PDP context and the signaling PCC rules.

Step S905. The PCEF receives the CCA message and installs the signaling PCC rules for the default PDP context.

Step S906. The PCEF returns a default PDP context activation response to the UE.

Thereafter, the user may initiate a request for activating the dedicated PDP context of the signaling IP flow. Steps S907-S912 illustrate a procedure of activating the PDP context of the signaling IP flow, deleting the signaling PCC rules for the default PDP context and installing signaling PCC rules for the PDP context of the signaling IP flow, and are described particularly as follows.

Step S907. The PCEF receives a request for activating a PDP context from the UE, where the request carries a signaling tag.

Step S908. The PCEF sends to the PCRF a CCR message including the parameter of Bearer Usage and an identifier of the PDP context of the signaling IP flow.

Step S909. The PCRF perceives that the PDP to be established is used to bear signaling in accordance with the parameter of Bearer Usage, and generates signaling PCC rules including the address of the AF.

Step S910. Via a CCA message, the PCRF instructs the PCEF to delete the signaling PCC rules for the default PDP context and install the signaling PCC rules for the PDP context of the signaling IP flow, where the CCA message includes: the identifier of the PDP context of the signaling IP flow and the signaling PCC rules; and the identifier of the default PDP context and the signaling PCC rules.

Step S911. The PCEF receives the CCA message, deletes the signaling PCC rules for the default PDP context and installs the signaling PCC rules for the PDP context of the signaling IP flow.

Step S912. The PCEF returns a signaling IP flow PDP context activation response to the UE.

Steps S913-S918 illustrate a procedure of subscribing to a signaling IP flow path status report and reporting the signaling IP flow path status, in which the PCEF sends a bearer event detection report of the PDP context corresponding to the signaling PCC rules, and the PCRF sends a signaling IP flow path status report in accordance with the signaling PCC rule names carried in the report.

Therefore, if the UE initiates subsequently no request for activating the PDP context of the signaling IP flow, session signaling is borne in the default PDP context, and the mechanism for reporting a signaling IP flow path status is implemented by the signaling PCC rules and the signaling PCC rule names for the default PDP context; if a request for activating the PDP context of the signaling IP flow is initiated, the session signaling is borne in the dedicated PDP context of the signaling IP flow, and the mechanism for reporting a signaling IP flow path status is implemented by the signaling PCC rules and the signaling PCC rule names for the PDP context of the signaling IP flow.

In the step S908, if the CCR message sent from the PCEF to the PCRF further includes a Traffic Flow Template (TFT) of the PDP context, the PCRF may also compare address in the TFT with the address of the AF in the step S909, and if the address in the TFT matches the address of the AF, the PCRF may perceive that the PDP to be established is used to bear signaling, and generate signaling PCC rules including the address of the AF. In other words, in the step S909, if the PCRF can not perceive that the PDP to be established is used to bear signaling in accordance with the parameter of Bearer Usage, the PCRF may further perceive that the PDP to be established is used to bear signaling in accordance with the TFT. Alternatively, the PCRF may perceive that the PDP to be established is used to bear signaling in accordance with the TFT directly, and generate signaling PCC rules including the address of the AF.

Figure 10:
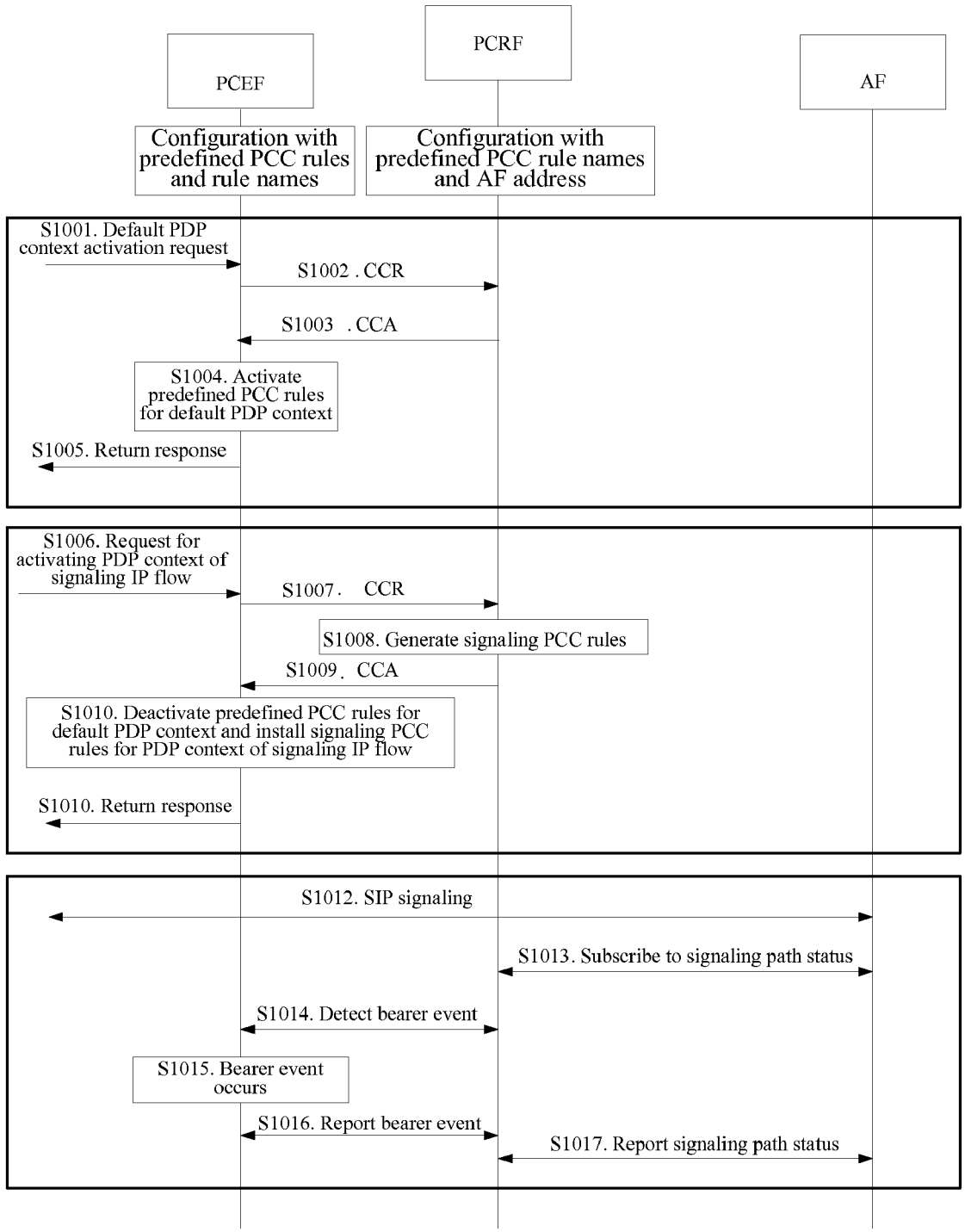

As illustrated in FIG. 10, the predefined PCC rules are activated in the default PDP context and the generated signaling PCC rules are installed in the dedicated PDP context of the signaling IP flow. In this embodiment, the PCEF is configured with the predefined PCC rules and the names thereof, and the PCRF is configured with the predefined PCC rule names and the address of the AF for processing SIP signaling for the UE.

Step S1008. The PCRF perceives that the PDP to be established is used to bear signaling in accordance with the parameter of Bearer Usage or the address information in the TFT, and generates signaling PCC rules including the address of the AF.

Step S1009. Through a CCA message, the PCRF instructs the PCEF to deactivate the predefined PCC rules for the default PDP context and install the signaling PCC rules for the PDP context of the signaling IP flow, where the CCA message includes: the identifier of the PDP context of the signaling IP flow and the signaling PCC rules; and the identifier of the default PDP context and the predefined PCC rule names.

Step S1010. The PCEF receives the CCA message, deactivates the predefined PCC rules for the default PDP context and installs the signaling PCC rules for the PDP context of the signaling IP flow.

Descriptions of the other steps are not given again. Therefore, if the UE initiates subsequently no request for activating the PDP context of the signaling IP flow, session signaling is borne in the default PDP context, and the mechanism for reporting a signaling IP flow path status is implemented by the predefined PCC rules and the predefined PCC rule names for the default PDP context; if a request for activating the PDP context of the signaling IP flow is initiated, the session signaling is borne in the dedicated PDP of the signaling IP flow, and the mechanism for reporting a signaling IP flow path status is implemented by the signaling PCC rules and the names thereof for the PDP context of the signaling IP flow.

Practically, the generated signaling PCC rules and the names thereof may be installed in the default PDP context, and the predefined PCC rules may be activated in the dedicated PDP context of the signaling IP flow, and in this embodiment, the PCEF needs to be configured with the predefined PCC rules and the names thereof, and the PCRF needs to be configured with the predefined PCC rule names and the address of the AF for processing SIP signaling for the UE. In this case, if the UE initiates subsequently no request for activating the PDP context of the signaling IP flow, the session signaling is borne in the default PDP context, and the mechanism for reporting a signaling IP flow path status is implemented by the signaling PCC rules and the names thereof installed in the default PDP context; and if a request for activating the PDP context of the signaling IP flow is initiated, the session signaling is borne in the dedicated PDP context of the signaling IP flow, and the mechanism for reporting a signaling IP flow path status is implemented by the predefined PCC rules and the names thereof activated in the PDP context of the signaling IP flow.

Figure 11:
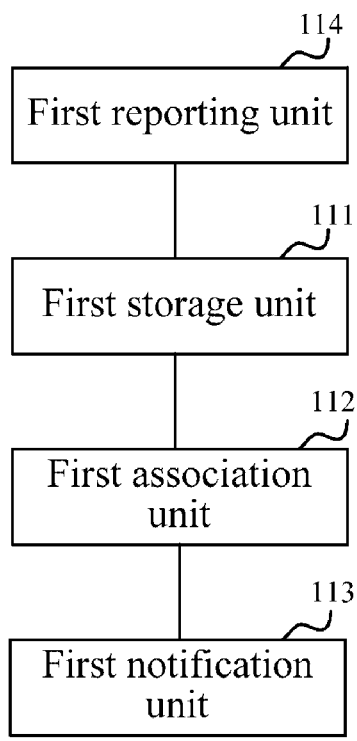
FIGS. 11 and 12 each are a schematic diagram of a general configuration of a PCRF according to an embodiment of the invention.

As shown in FIG. 11, a PCRF is provided according to yet another embodiment of the invention, and the PCRF includes:
a first storage unit 111 adapted to store the predefined PCC rules and the names thereof;
a first association unit 112 adapted to activate the predefined PCC rules and the names thereof for a PDP context to be activated as requested;
a first notification unit 113 adapted to instruct a PCEF to activate the predefined PCC rules for the PDP context; and
a first reporting unit 114 adapted to receive a PDP bearer event detection report carrying the predefined PCC rule names, and send a signaling IP flow path status report to an Application Function.

Figure 12:
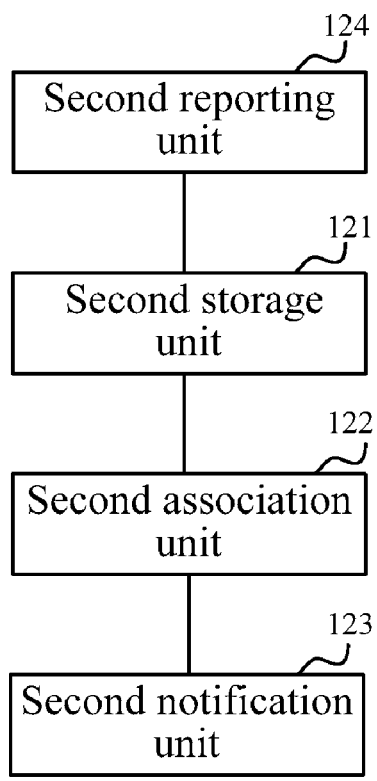

As shown in FIG. 12, a PCRF is provided according to another embodiment of the invention, and the PCRF includes:
a second storage unit 121 adapted to store a preconfigured address of an AF;
a second association unit 122 adapted to generate signaling PCC rules including the address of the AF and names of the signaling PCC rules, and activate the signaling PCC rules and the names thereof for a PDP context to be activated as requested;
a second notification unit 123 adapted to instruct a PCEF to install the signaling PCC rules for the PDP context; and
a second reporting unit 124 adapted to receive a PDP bearer event detection report carrying signaling PCC rule names, and send a signaling IP flow path status report to the AF.

According to yet another embodiment of the invention, there is provided a PCRF with configuration as structured in FIGS. 11 and 12.

Apparently, various modifications and variations can be made to the invention without departing from the spirit and scope of the invention by those skilled in the art, and therefore the invention is intended to encompass all these modifications and variations provided that they fall within the scope of the claims appended to the invention and their equivalents.

The invention claimed is:

1. A method for reporting a bearer event of a signaling IP flow, comprising:
generating, by a processor of an apparatus operable to provide an Application Function, flow identifier information of a signaling IP flow;
sending, by the apparatus operable to provide an Application Function, a subscription request for subscribing to a bearer event of the signaling IP flow to an apparatus operable to provide Policy Control and Charging Rules Function, wherein the subscription request carries the flow identifier information of the signaling IP flow; and
receiving, by the apparatus operable to provide an Application Function, a bearer event report of the signaling IP flow generated by a processor of the apparatus operable to provide Policy Control and Charging Rules Function, wherein the bearer event report carries the flow identifier information of the signaling IP flow, wherein the flow identifier information comprises a media component number and an IP flow number, and the signaling IP flow is provided with a default media component number 0.

2. The method according to claim 1, further comprising:
establishing, by the apparatus operable to provide Policy Control and Charging Rules Function, Policy Control and Charging rules and Policy Control and Charging rule names corresponding to the signaling IP flow in accordance with the flow identifier information of the signaling IP flow, and sending the Policy Control and Charging rules and the Policy Control and Charging rule names to an apparatus operable to provide Policy and Charging Enforcement Function;

reporting, by the apparatus operable to provide Policy and Charging Enforcement Function, upon detection of the bearer event subscribed to by the apparatus operable to provide Policy Control and Charging Rules Function, the Policy Control and Charging rule names associated with the bearer event and the detected bearer event to the apparatus operable to provide Policy Control and Charging Rules Function; and generating, by a processor of the apparatus operable to provide Policy Control and Charging Rules Function, the bearer event report carrying information including the flow identifier information of the signaling IP flow corresponding to the Policy Control and Charging rule names associated with the bearer event.

3. The method according to claim 2, further comprising:
establishing, by the apparatus operable to provide Policy Control and Charging Rules Function, upon receiving the subscription request, the Policy Control and Charging rules and the Policy Control and Charging rule names corresponding to the signaling IP flow in accordance with the flow identifier information of the signaling IP flow, after determining whether a Policy Control and Charging rule or a Policy Control and Charging rule name is available for the signaling IP flow.

4. The method according to claim 1, further comprising:
sending, by the apparatus operable to provide Policy Control and Charging Rules Function, if the apparatus operable to provide Policy Control and Charging Rules Function determines that the Policy Control and Charging rules and Policy Control and Charging rule names are available for the signaling IP flow in accordance with the flow identifier information of the signaling IP flow, the Policy Control and Charging rules and the Policy Control and Charging rule names to an apparatus operable to provide Policy and Charging Enforcement Function;

reporting, by the apparatus for providing Policy and Charging Enforcement Function, upon detection of the bearer event subscribed to by the apparatus for providing Policy Control and Charging Rules Function, the Policy Control and Charging rule names associated with the bearer event and the detected bearer event to the apparatus for providing Policy Control and Charging Rules Function; and generating, by a processor of the apparatus operable to provide Policy Control and Charging Rules Function, the bearer event report carrying information including the flow identifier information of the signaling IP flow corresponding to the Policy Control and Charging rule names associated with the bearer event.

5. An apparatus operable to provide an Application Function, comprising:
a first subscription request sending unit adapted to send a subscription request for subscribing to a bearer event of a signaling IP flow to an apparatus operable to provide Policy Control and Charging Rules Function, wherein the subscription request is generated by a processor and carries a generated flow identifier information of the signaling IP flow; and a first bearer event report receiving unit adapted to receive a bearer event report of the signaling IP flow from the apparatus operable to provide Policy Control and Charging Rules Function, where the bearer event report carries the flow identifier information of the signaling IP flow; wherein the flow identifier information comprises a media component number and an IP flow number, and the signaling IP flow is provided with a default media component number 0.

* * * * *